United States Patent [19]

Hayner et al.

[11] Patent Number: 6,048,447
[45] Date of Patent: Apr. 11, 2000

[54] ASPHALT COMPOSITIONS CONTAINING SOLVENT DEASPHALTED BOTTOMS AND REREFINED LUBE OIL BOTTOMS, AND THEIR PREPARATION

[75] Inventors: Roger E. Hayner, Russell; Patricia K. Doolin, Ashland; Howard F. Moore, Catlettsburg; Donald P. Malone, Grayson, all of Ky.

[73] Assignee: Marathon Ashland Petroleum LLC

[21] Appl. No.: 09/026,448

[22] Filed: Feb. 19, 1998

[51] Int. Cl.[7] ....................................... C10C 3/08
[52] U.S. Cl. ................... 208/39; 208/41; 208/45; 106/274
[58] Field of Search ................ 208/39, 45; 106/274

[56] References Cited

U.S. PATENT DOCUMENTS

| | | | |
|---|---|---|---|
| 3,919,072 | 11/1975 | Pitchford et al. | 208/39 |
| 4,101,414 | 7/1978 | Kim et al. | 208/18 |
| 4,283,231 | 8/1981 | Clementoni | 208/44 |
| 4,432,865 | 2/1984 | Norman | 208/183 |
| 4,459,157 | 7/1984 | Koons | 208/44 |
| 4,777,064 | 10/1988 | Sione | 208/23 |
| 4,904,305 | 2/1990 | Zonzotto et al. | 106/184 |
| 5,244,565 | 9/1993 | Lankton et al. | 208/92 |
| 5,447,628 | 9/1995 | Harrison et al. | 208/179 |
| 5,580,376 | 12/1996 | Hayner | 106/284.1 |
| 5,601,697 | 2/1997 | Miller et al. | 208/45 |
| 5,728,291 | 3/1998 | Miller | 208/45 |

*Primary Examiner*—Helane Myers
*Attorney, Agent, or Firm*—Laurence P. Hobbes; Richard D. Stone

[57] ABSTRACT

An asphalt composition is provided which contains i) an asphalt component containing solvent-deasphalted bottoms, ii) a rerefined lube bottoms fraction, iii) an optional fluxing component, and iv) an optional vacuum bottoms component. The invention further relates to a method of preparing the asphalt composition and a paving composition containing same.

19 Claims, No Drawings

ASPHALT COMPOSITIONS CONTAINING SOLVENT DEASPHALTED BOTTOMS AND REREFINED LUBE OIL BOTTOMS, AND THEIR PREPARATION

BACKGROUND OF THE INVENTION

1. Field of the Invention

The invention relates to asphalt compositions and to a process for the improvement of their properties. The invention further relates to modified asphalt compositions useful in a variety of applications, particularly paving asphalts.

2. Description of the Prior Art

In the production of asphalt, crude oil is fractionated in a crude tower to produce crude tower bottoms which are passed to a vacuum tower to produce vacuum tower bottoms which can be sent directly to asphalt product. In addition, the asphalt product can be varied by adjusting conditions in the vacuum tower. For example, the asphalt can be made to have a higher viscosity by operating the vacuum tower at a higher temperature and/or lower pressure to remove heavier distillate as overhead from the vacuum tower. Alternatively, the asphalt can be increased in viscosity by oxidizing it. While this suffices for most 1980 or earlier asphalt specifications, it is difficult to meet newer specifications by merely altering the temperature and pressure of the vaccum tower, or even by oxidation. Indeed, recent asphalt specifications may preclude oxidation of the asphalt. In such instances, the methods of varying the properties of the finished asphalt to meet desired specifications will be to adjust conditions in the vacuum tower, to actually purchase crudes suited for producing the particular asphalt product desired, to add relatively expensive polymer additives to the asphalt and/or to add a mixture of solvent deasphalting bottoms and aromatic extract.

Solvent deasphalting (extraction of asphalts from heavy petroleum stocks) is a well-known petroleum process and is described in U.S. Pat. No. 3,951,781 to Owen (Mobil); U.S. Pat. No. 3,968,023 to Yan (Mobil); U.S. Pat. No. 3,972,807 to Uitti (UOP); U.S. Pat. No. 3,975,396 to Bushnell (Exxon); U.S. Pat. No. 3,981,797 to Kellar (UOP); U.S. Pat. No. 3,998,726 to Bunas (UOP); U.S. Pat. No. 4,017,383 to Beavon (Ralph M. Parsons); U.S. Pat. No. 4,054,512 to Dugan (Exxon); U.S. Pat. No. 4,101,415 to Crowley (Phillips); U.S. Pat. No. 4,125,458 to Bushnell (Exxon); and numerous others. Specific proprietary processes include the SOLVAHL solvent deasphalting process licensed by Institute Francais de Petrole, and the low-energy deasphalting process licensed by Foster Wheeler, U.S.A., shown schematically in FIG. 1. Deasphalting processes also include the ROSE supercritical fluid technology licensed by Kerr-McGee Corporation.

U.S. Pat. No. 5,601,697 to Miller et al. teaches SDA-produced asphalts (containing solvent deasphalting bottoms) made by blending SDA bottoms with aromatic extract and optionally, asphalt cement from vacuum bottoms, AC5. Preferably the extract is produced from an extraction process such as that employed in lubricating oil production. The blending process produces asphalts of superior characteristics, e.g., PG64-22, which can meet the new Strategic Highway Research Program (SHRP) specifications for dynamic sheer, creep stiffness, and direct tension (tensile strength). As the new SHRP asphalt specifications impact the marketplace, particularly aided by the recent increases in federal funds for highway construction and repair, these new asphalt products will be particularly advantageous.

Due to the aromatic nature of the lube plant extract used, there may exist applications in which the aromatic content should be reduced or eliminated from an environmental or toxicological standpoint. Also, there may be interruptions or reductions in the supply of the extract resulting from changes in the refinery operation. Accordingly, it would be advantageous to provide a less aromatic substitute for or additive to the aromatic extract which provides similar effects on solvent deasphalted bottoms-containing asphalts, namely, providing improved dynamic sheer, creep stiffness, and direct tension (tensile strength).

U.S. Pat. No. 4,381,992 to Wood et al. (Phillips) teaches the process for purification of used oil by removal of the ash forming components and then subjecting the material to vacuum fractionation. The patent discusses that such fractionation renders a bottoms material too heavy for use as a lubricating oil, but useful as a gear oil or as an asphalt additive. No further mention of usefulness of the bottoms material is made. The claims of the invention deal only with the purification of used oil processes, a method for fractionating the same and in no form discuss the novel findings of our invention.

U.S. Pat. No. 5,447,628 to Harrison, et al. teaches heating used lubricating oils to an additive decomposition temperature of 400° F. (204° C.) to 1000° F. (538° C.) via direct heat heat exchange by mixing with a heated product oil. The process provides a rerefined lube oil fraction free of organo-metallic compounds such as zinc dithiophosphate, and a bottoms fraction containing organo-metallics which can be used as an asphalt extender or fuel oil.

U.S. Pat. No. 4,101,414 to Kim, et al., incorporated herein by reference, discloses predistillation by steam stripping for several hours of a used lubricating oil stock in order to remove light oil, residual water, sulfur, and $NO_x$. The temperature is kept at temperatures which avoid additive breakdown, and the process provides an odorless concentrate product upon vacuum distillation which contains heavy lube hydrocarbons, additives, metals, metal compounds, and the like. The concentrate product may be used as a grease, automotive undercoating, and a road sealant, inter alia.

German Patent DD 220,038-A1 discloses a binder for road building which comprises a propane bitumen, extract oil obtained in the selective refining of lubricating oil fractions, composed mainly of aromatic hydrocarbon fractions, and a deacidified, dehydrated and oil-freed cracking resin from controlled sulfuric acid refining of hydrocarbon oils and used oils. In contrast, the present invention does not utilize a resin fraction, but rather the heavy bottoms from distillation of used lubricant oils.

SUMMARY OF THE INVENTION

General Statement of the Invention

The present invention relates to asphalt compositions containing i) an asphalt component containing solvent-deasphalted bottoms, ii) a rerefined lube bottoms fraction, iii) an optional fluxing component, e.g., lube plant extract, and iv) an optional vacuum bottoms component, e.g., asphalt cements such as AC 5. The invention further relates to modified asphalt compositions useful in a variety of applications, particularly paving asphalts.

The present invention also provides a method for preparing asphalt composition comprising:

a) forming a mixture comprising at least 0.5 wt. % solvent deasphalting bottoms, and 0.5 to 50 weight percent of bottoms from rerefining of a lube oil, 0 to 50 wt. % of optional fluxing component, e.g., lube plant extract, and 0 to 90 wt. % of an optional vacuum bottoms component, e.g., asphalt cement such as AC 5.

In yet another aspect, the invention relates to a pavement composition comprising an aggregate or aggregate material and from 1.0% to 20.0% of a paving asphalt composition comprising a mixture containing solvent deasphalting bottoms and bottoms from rerefining of a lube oil.

The mixture containing solvent deasphalting bottoms and bottoms from rerefining of a lube oil can contain 0.5 to 95 wt %, preferably 5 to 90 wt %, more preferably, 10 to 80 wt. %, SDA bottoms, e.g., those obtained from solvent extraction of vacuum bottoms, said SDA bottoms having Ring and Ball Softening Points ranging from 40° to 120° C., boiling points greater than 510° C. (950° F.), preferably greater than 540° C. (1000° F.), and 0.5 to 50 wt %, preferably 1 to 30 wt %, say, e.g., 2 to 15 wt. %, of bottoms from rerefining of a lube oil. Such mixture can further comprise 0 to 50 wt. %, preferably 0 to 30 wt. %, more preferably 0 to 20 wt. % of lube plant extract of boiling range 93° to 704° C. (200° to 1300° F.), preferably 121° to 593° C. (250° to 1100° F.), e.g., those obtained from lubricant production. The mixture, in addition to SDA bottoms and bottoms from rerefining of a lube oil can further contain, 0 to 90 wt. %, preferably 0 to 60 wt. %, more preferably 0 to 50 wt. % of vacuum bottoms from vacuum distillation.

Asphalt Components

The asphalt components include a variety of organic materials, solid or semi-solid at room temperature, which gradually liquify when heated, and in which the predominate constituents are naturally occurring bitumens, e.g., Trinidad Lake, or residues commonly obtained in petroleum, synthetic petroleum, or shale oil refining, or from coal tar or the like. For example, vacuum tower bottoms produced during the refining of conventional or synthetic petroleum oils are a common residue material useful as asphalt composition. In the present invention, the asphalt component comprises solvent deasphalting bottoms.

SDA Bottoms

Solvent deasphalting bottoms are obtained from suitable feeds such as vacuum tower bottoms, reduced crude (atmospheric); topped crude, and preferably hydrocarbons comprising an initial boiling point of about 450° C. (850° F.) or above. The solvent deasphalting bottoms can be obtained from vacuum tower bottoms, preferably boiling above 538° C. (1000° F.). Solvent deasphalting can be carried out at temperatures of 93–148° C. (200–300° F.). After solvent deasphalting, the resulting SDA bottoms have a boiling point above 510° C. (950° F.), preferably above 540° C. (1000° F.), and a penetration of 0 to 70 dmm @ 25° C. (77° F.), preferably 0 to 50 dmm @ 25° C. (77° F.).

Fluxing Components

Suitable fluxing components are added to improve the flow properties of the asphalt composition and can improve the penetration for a desired softening point. Such fluxing components include rerefined lube oil bottoms Rerefined Lube Oil Bottoms Automotive lubricating oils are usually formulated from paraffin based petroleum distillate oils or from synthetic base lubricating oils. Lubricating oils are combined with additives such as soaps, extreme pressure (E.P.) agents, viscosity index (V.I.) improvers, antifoamants, rust inhibitors, antiwear agents, antioxidants, and polymeric dispersants to produce an engine lubricating oil of SAE 5 to SAE 60 viscosity.

After use, this oil is collected from truck and bus fleets, automobile service stations, and municipal recycling centers for reclaiming. This collected oil contains organo-metallic additives such as zinc dithiophosphate from the original lubricating oil formulation, sludge formed in the engine, and water. The used oil may also contain contaminants such as waste grease, brake fluid, transmission oil, transformer oil, railroad lubricant, crude oil, antifreeze, dry cleaning fluid, degreasing solvents such as trichloroethylene, edible fats and oils, mineral acids, soot, earth and waste of unknown origin.

Reclaiming of waste oil is largely carried out by small processors using various processes tailored to the available waste oil, product demands, and local environmental considerations. Such processes at a minimum include distillation which provides an overhead rerefined lube oil product and rerefined lube oil bottoms product, which can contain considerable amounts of metals. Because solvent deasphalting bottoms contain large amounts of metals as well, products containing SDA bottoms are not especially sensitive to the presence of additional metals. Accordingly, SDA bottoms-containing products are suitable candidates for addition of rerefined lube oil bottoms. Moreover, the addition of rerefined lube oil bottoms to such products provides a way to vary softening points, or other properties affected by addition of diluent, e.g., viscosity, penetration, or rheological properties.

The present invention can employ any suitable rerefined lube oil bottoms product obtained by distilling used motor oils. Examples of such processes which provide rerefined lube oil bottoms are disclosed below.

U.S. Pat. No. 4,432,865 to Norman, discloses contacting used motor oil with polyfinctional mineral acid and polyhydroxy compound to react with undesired contaminants to form easily removable reaction products. Used lubricating oils can be heated to an additive decomposition temperature of 400° F. (204° C.) to 1000° F. (538° C.) by direct heat exchange by mixing with a heated product oil as disclosed in U.S. Pat. No. 5,447,628 to Harrison, et al. U.S. Pat. No. 4,101,414 to Kim, et al., discloses predistillation by steam stripping for several hours of a used lubricating oil stock in order to remove light oil, residual water, sulfur, and $NO_x$. The temperature is kept at temperatures which avoid additive breakdown, and the process provides a concentrate product upon vacuum distillation. Flow processes using heat exchange by direct contact with hot hydrogen include UOP's Hy-Lube described in U.S. Pat. Nos. 5,244,565 and 5,302,282 which feature an initial used oil feed fractionation step to remove sludge and a majority of metals utilizing a hot circulating hydrogen stream as a heating medium to avoid deposition of decomposed organo-metallic compounds on heating surfaces, followed by a hydrotreating circuit with caustic neutralization to eliminate chlorides, with a final product fractionation step.

An especially suitable source of rerefined lube oil bottoms is disclosed in co-pending U.S. patent application Ser. No. 09/026,367, filed contemporaneously herewith, (Attorney's Docket No. 6572), the contents of which are incorporated herein by reference, which provides an efficient method for demetallizing used motor oil by thermal treatment using direct heat exchange in a process which does not require apparatus susceptible to clogging or fouling under the conditions encountered during decomposition of metallic additives, and which does not require preseparation of light materials or water found in used motor oil as collected. The process recovers lube oil base stocks from used lubricating oil formulations containing base oil stock and organo-metallic component by:

i) directly contacting said used lubricating oil with a heated vapor under temperature, contact times, and superficial velocity conditions sufficient to at least partially decompose said organo-metallic component and provide a desired volume of pumpable bottoms and vaporized overhead comprising gases and distillatable hydrocarbons without entraining said organo-metallic component into the overhead;

ii) condensing said overhead in at least one stage;

iii) recovering at least part of said overhead as distillate; and iv) recovering a bottoms fraction containing organo-metallic compound decomposition products. The contacting can be carried out as a batch process in a vessel charged with said used lubricating oil or alternatively, as a continuous process wherein said contacting of said used lubricating oil with a heated vapor occurs in a flow mixing means, e.g., a nozzle. In a preferred embodiment, the process is carried out as a batch process using a plurality of vessels in parallel by v) optionally charging at least one additional vessel with said used lubricating oil before, during, and/or after said vaporization in step i) to provide an additional source of overhead to said condensing step ii). The flow of overhead from step v) can be controlled so as to provide a flow of overhead to step ii), e.g., during charging of the vessel with used lubricating oil, step iii) and/or step iv), which flow preferably can be essentially continuous. Two, three, or more vessels may be employed in parallel in order to smooth out the flow of overhead to the condensation step and hot vapor from the heater. In general, the longer the time required by charging the vessel and step i), the greater the need for plural vessels. The time required may be so great that the use of two vessels in parallel may still not suffice to provide a continuous flow of overhead to the condensation step, indicating the use of three or even more vessels.

By the term vapor is meant a material in gaseous form as introduced into the present process. This would include those materials which can be in a non-gaseous form at room temperature, e.g. H,O (steam). The heated vapor employed in the present invention is selected from the group of gases/vapors consisting of hydrogen, methane, ethane, propane, and steam. The heated vapor is introduced in the vessel at temperatures ranging from 450 to 1800° F., preferably from 700 to 1100° F., at a rate of 0.1 to 10 pounds/pound of charge, preferably 2 to 3 pounds/pound of charge. Superficial velocities are low enough to prevent entrainment of organo-metallic compounds in the overhead, generally no greater than 5.5 feet per minute, preferably no greater than 3 feet per minute. Vaporization temperatures achieved in the vessel can range from 400 to 1000° F., preferably 550 to 650° F. The used lubricating oil is contacted with the heated vapor for a period ranging from 0.1 to 1 hour, preferably 0.25 to 0.5 hours. The vaporization temperatures, steam rates, superficial velocities and contact times are adjusted to provide a preset volume reduction of the total amount of used lubricating oil added to the vessel (or degree of lift of overhead vapors), e.g., ranging from 20 to 95 wt. %, preferably from 60 to 90 wt. % of the total amount of used lubricating oil added to the vessel. In one embodiment, the heated vapor is recovered from the overhead and recycled to step i). This is especially useful where the heated vapor is selected from the group consisting of hydrogen, methane, ethane, and propane.

The above conditions may be varied to adjust the extent of decomposition of the organo-metallic component made up of organo-metallic compounds in the used lubricating oil. Suitable used lubricating oils may contain organo-metallic compounds in a concentration of 0.01 to 5.0 wt. %. The treatment can decompose the organo-metallic component to an extent sufficient to provide a product having an organo-metallic component concentration of 0.005 wt. % or less, preferably less than 0.001 wt. %. The heated vapor employed can be superheated steam. The use of steam lowers partial pressure of the vaporization of the overhead so that vaporization temperatures no greater than 650° F. or even 600° F. can be used. Such lower vaporization temperatures combined with lower contact times are particularly desirable inasmuch as they minimize the decomposition of valuable additives of the used lubricating oils, such as viscosity index improvers, pour point depressants, defoamants, and detergent-dispersants, which can be present in used lubricating oils in amounts of at least 0.1 wt. %, e.g., ranging from 0.1 to 25 wt. %, preferably 1 to 10 wt. %. In one aspect of the present invention, the rerefined lube oil bottoms employed contain at least 0.1 wt. %, preferably 1 to 5 wt. %, viscosity index improvers.

Lube Plant Extract

The optional lube plant extract component can be produced by solvent extraction processes providing a concentrate which is extracted from a suitable heavy petroleum stream, e.g., waxy distillate (WD) which, after dewaxing, produces a wax-free lube oil preferably having a viscosity ranging from 10 to 1000 SUS, preferably 50 to 800 SUS, e.g., 330 SUS at 100° F. (330 extract). Any suitable aprotic solvent extractor may be employed, e.g., sulfolane, furfural, or N-methylpyrollidone, with furfural especially preferred. The lube plant extract such as 330 extract can preferably be from a lube oil plant but can be from other extraction steps in hydrocarbon refining processes.

Asphalt Cement

The asphalt composition of the present invention may optionally include an asphalt cement component of reduced viscosity relative to the SDA bottoms component. Such asphalt cement component can have a viscosity of 100 to 5000 poises at 60° C. (140° F.), preferably 250 to 4000 poises, e.g., 500 poises for AC5 asphalt cement. The asphalt cement component is added in amounts sufficient to provide the resulting asphalt composition with the desired viscosity for the intended application, e.g., 2000 poises at 60° C. (140° F.) for paving applications. For Performance Graded Applications, the asphalt compositions will have a G*/sin delta value in excess of 1.0 kPa at temperatures ranging from 46 to 82° C., preferably 52 to 76° C. Generally, the asphalt compositions of the present invention may contain from 0 to 95 wt %, preferably from 0 to 80 wt %, e.g., 5 to 95 wt %, of such asphalt cement component. The asphalt cement component of reduced viscosity can be obtained from any suitable source, e.g., atmospheric distillation bottoms.

Polymer Additives

Particularly useful is the addition of styrene butadiene copolymers diblock SB or Triblock SBS (styrene butadiene styrene) to the blended asphalt products of the present invention which contain SDA bottoms. While the invention is not to be limited to any theory, these copolymers apparently cause polymerization with the solvent deasphalted blends of the invention, and the aromatic oils in the asphalt blends help to solubilize the copolymers into the asphalt, providing substantially improved stability. Suitable polymers include styrene-butadienes such as those taught in U.S. Pat. No. 4,554,313 to Hagenbach (assigned Elf); U.S. Pat. No. 4,242,246 to Maldonado (Elf); U.S. Pat. No. 4,162,999 to Bohemen (British Petroleum); U.S. Pat. No. 5,120,777 to Chaverot (Elf); U.S. Pat. No. 4,567,222 to Hagenbach (Elf); U.S. Pat. No. 5,118,733 to Gelles (Shell); U.S. Pat. No. 5,039,342 to Jelling (National Patent Development); U.S. Pat. No. 5,023,282 to Neubert (GenCorp); U.S. Pat. No. 3,238,173 to Bailey (Shell); U.S. Pat. No. 4,585,816 to Vitkuske (Dow Chemical) (diene/vinyl aromatic block copolymers, e.g. methylstyrene, tertiary butyl styrene, etc.); U.S. Pat. No. 5,059,300 to McGinnis (Chevron) (phosphoric acid); U.S. Pat. No. 4,393,155 to Garrett (Ashland Oil) (polyacrylamides). It is especially preferred to add styrene-butadiene copolymers or styrene-butadiene-styrene (SBS) copolymers to the blended asphalt products of the present invention. Such copolymers are added in amounts comprising 0.1 to 20 wt %, preferably 0.5 to 12 wt % copolymers.

Utility of the Invention

The present invention is useful for the production of valuable high-specification asphalts having increased resistance to rutting at high temperatures (46° to 82° C.), as outlined in the Performance Based PG Specifications contained in AASHTO MP-1.

DESCRIPTION OF THE PREFERRED EMBODIMENTS

EXAMPLE 1

The Invention

A superheated steam stripper was used to vaporize 60–90% of a used motor oil leaving most of the metals and additives behind in the residue. Even with high lift values, the overhead oil contains only trace levels of metals and the overhead can be further processed without fouling reactor tubes. Additives present in used motor oil such as viscosity improvers are concentrated in the residue and are believed to impart improved viscosity properties when added to asphalt binders.

The superheated steam stripper can be operated to produce a variety of lift values, e.g., from 60% to 90%. As the lift is increased, the residue becomes heavier as metals and additives present in used motor oil are not carried overhead and become concentrated in the residue. Heavier residue fractions contain a higher concentration of the additives.

A light fraction was produced using a continuous feed mode with a lift value of 60% and possessed a viscosity of 6 poise at 140° F. The heavy residue was produced using the batch mode of operation with a lift value of 90% and possessed a viscosity of 140 poise at 140° F. Potential benefits from the viscosity improvers in used motor oil are more pronounced in blends made from the heavier material.

Light Used Motor Oil Residue (6 Poise)
AC-5 Blends

Flux oils were added to AC-5 binders to improve the low temperature properties. Data listed in Table 1 below compare how different flux oils affect binder properties. Because different batches of AC-5 were used to prepare the blends, each set must be compared to its base asphalt. Flux oils lowered both the high and low temperature limits of the asphalt.

TABLE 1

Comparison of Asphalt Blends Made with AC-5

| Ex. | Blend | Viscosity @135° F. Cps | Viscosity @140° F. Poise | PG Grade | High ° C. | Low ° C. | UTI ° C. |
|---|---|---|---|---|---|---|---|
| A | St.Paul AC-5 | 372 | 760 | PG52-22 | 57.1 | −22.9 | 80.0 |
| B | C'burg VTB | 191 | 345 | PG52-28 | 52.0 | −29.6 | 81.6 |
| C | C'burg AC-5 | | 509 | | | | |

TABLE 1-continued

Comparison of Asphalt Blends Made with AC-5

| Ex. | Blend | Viscosity @135° F. Cps | Viscosity @140° F. Poise | PG Grade | High ° C. | Low ° C. | UTI ° C. |
|---|---|---|---|---|---|---|---|
| D | AC5 + 3% Foots Oil | 155 | | PG52-28 | 52.4 | −31.0 | 83.4 |
| E | AC5 + 3% N-oil | 175 | | PG52-28 | 54.3 | −32.9 | 87.2 |
| F | AC5 + 3% Ar.Extract | 190 | | PG52-22 | 55.9 | −30.6 | 86.5 |
| G | AC-5 + 3% Waxy Distillate | 177 | | PG52-28 | 55.2 | −31.6 | 86.8 |
| H | AC5 + 3% UMO | 203 | | PG46-28 | 51.5 | −35.1 | 86.6 |
| I | AC5 + 3% UMO | 205 | | PG46-28 | 51.2 | −34.7 | 85.9 |
| J | AC5 + 3.5% 6302 + 3% Foots Oil | 420 | 1384 | PG52-28 | 54.4 | −32.1 | 86.5 |
| K | AC5 + 3.5% 6302 + 3% N-Oil | 430 | 1469 | PG52-34 | 55.7 | −35.5 | 91.2 |
| L | AC5 + 3.5% 6302 + 3% HVGO | 433 | | PG52-34 | 57.1 | −34.8 | 91.9 |
| M | AC5 + 3.5% 6302 + 3% UMO | 522 | | PG52-34 | 55.6 | −34.4 | 90.0 |

Special asphalt grades were made by adding both polymers and flux oils into the mix. Flux and polymers work together to maintain the high temperature grade and improve the low temperature properties. A PG52-34 grade was obtained with AC-5 and 3.5 wt. % Enichem 6302, available from Enichem Elastomers, and 3 wt. % neutral oil, Heavy Vacuum Gas Oil (Texaco 61205 HVGO from First Recovery) produced from used motor oil by conventional distillation wherein the used motor oil is heated by contact with heated heat exchange surfaces, or used motor oil residue from superheated steam treatment (UMO) wherein the used motor oil is heated by direct contact with superheated steam. Foots oil did not perform as well as the other flux oils due to its waxy nature. The HVGO and 325 neutral oil performed slightly better than the UMO residue (although a different batch of AC-5 was used to prepare the UMO blend which may have affected results). The results indicated that the light UMO residue can be used as flux oil for asphalt binders. Properties of blends made with 3% UMO residues will be similar to those made with 325 neutral oil.

Heavy Used Motor Oil Residue (140 Poise)
SDA Asphalt Blends

The heavy UMO residue was used to make AC-40 type asphalt blends. Commercial SDA asphalts were made by blending SDA bottoms, aromatic extract and AC-5 until the desired viscosity was reached. For the current set of experiments, the SDA bottoms/aromatic extract ratio was held constant at 4/1 which is useful for a pumpable blend stream. This ratio also keeps the total amount of aromatic extract in the final blend to approximately 10%, a level which avoids smoking problems. Blends possessing a viscosity of about 4000 poise at 140° F. were made with 0.0 to 10.4 wt. % UMO bottoms. Composition of these blends are listed below in Table 2 and SHRP properties are displayed in Table 3 below.

TABLE 2

Composition of SDA Asphalt Blends

| Ex. | Blend | Viscosity @140° F. | % UMO Bottoms | % SDA Bottoms | % Aromatic Extract | % AC5 |
|---|---|---|---|---|---|---|
| I | SDA + Ar + AC5 | 4152 | 0.0 | 37.0 | 10.0 | 53.0 |
| II | SDA + Ar + AC5 + UMO | 3958 | 2.6 | 39.0 | 10.0 | 48.4 |
| III | SDA + Ar + AC5 + UMO | 4438 | 5.2 | 41.0 | 10.5 | 43.3 |
| IV | SDA + Ar + AC5 + UMO | 4613 | 10.4 | 45.0 | 11.5 | 33.1 |

TABLE 3

SHRP Properties of SDA Asphalt Blends

| Ex. | % UMO Bottoms | Viscosity @140° F. | PG Grade | High ° C. | Low ° C. | UTI ° C. |
|---|---|---|---|---|---|---|
| I | 0.0 | 4152 | PG64-10 | 68.6 | −19.8 | 88.4 |
| II | 2.6 | 3958 | PG70-22 | 70.6 | −23.8 | 94.4 |
| III | 5.2 | 4438 | PG70-22 | 70.4 | −22.7 | 93.1 |
| IV | 10.4 | 4613 | PG70-22 | 72.8 | −24.3 | 97.1 |

As the used motor oil bottoms concentration is increased from 0 to 10%, the amount of AC-5 needed to produce an AC-40 material is reduced from 53% to 33%. Because AC5 is a high value product, this provides an economic benefit to the refinery. In addition, the UMO blends display larger UTI values as the used motor oil bottoms concentration is increased. This provides a larger safety margin for both high and low temperature grades.

The above results show that used motor oil residues produced by superheated steam distillation are good additives for asphalt binders. UMO residues produced with low lift rates behave like 325 Neutral oil and can improve the low temperature properties of an asphalt binder. Used motor oil residue is compatible with SBS polymers and can therefore be used in polymer blends. Heavier residue produced at high lift values appears to be an effective additive for SDA asphalt blends and can reduce the demand for more expensive AC-5.

Modifications

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein. Reference to documents made in the specification is intended to result in such patents or literature being expressly incorporated herein by reference including any patents or other literature references cited within such documents.

What is claimed is:

1. An asphalt composition containing i) an asphalt component containing solvent-deasphalted bottoms, ii) a rerefined lube bottoms fraction by a process consisting essentially of distillation, iii) an optional fluxing component, and iv) an optional vacuum bottoms component.

2. The asphalt composition of claim 1 wherein said fluxing component comprises a lube plant extract and said vacuum bottoms component comprises an asphalt cement.

3. The asphalt composition of claim 1 wherein said vacuum bottoms component comprises AC5 asphalt cement having a viscosity of 500 poises at 60° C.

4. The asphalt composition of claim 1 containing i) said asphalt component containing 0.5 to 95 wt. % of said solvent deasphalting bottoms, ii) 0.5 to 50 wt. % of said bottoms from rerefining of a lube oil, iii) 0 to 50 wt. % of fluxing component, and iv) 0 to 90 wt. % of said vacuum bottoms component.

5. The asphalt composition of claim 4 containing i) said asphalt component containing 10 to 80 wt % of said solvent deasphalting bottoms, ii) 2 to 10 wt. % of said bottoms from rerefining of a lube oil, iii) 0 to 20 wt. % of fluxing component, and iv) 0 to 50 wt. % of said vacuum bottoms.

6. The asphalt composition of claim 1 wherein said bottoms from rerefining of a lube oil is prepared by direct contact with superheated steam.

7. The asphalt composition of claim 1 wherein said bottoms from rerefining of a lube oil contain at least 0.1 wt. % of viscosity index improver.

8. The asphalt composition of claim 1 which further comprises 0.1 to 20 wt. % added polymers selected from the group consisting of styrene-butadiene (SB) copolymers and styrene-butadiene-styrene (SBS) copolymers.

9. A method for preparing asphalt composition comprising:
   a) forming a mixture comprising at least 0.5 wt. % solvent deasphalting bottoms, 0.5 to 50 weight percent of bottoms from rerefining of a lube oil by a process consisting essentially of distillation, 0 to 50 wt. % of fluxing component, and 0 to 90 wt. % of a vacuum bottoms component.

10. The method of claim 9 comprising:
   a) forming a mixture comprising 5 to 90 wt. % solvent deasphalting bottoms, 1 to 30 weight percent of bottoms from rerefining of a lube oil, 0 to 30 wt. % of fluxing component, and 0 to 60 wt. % of a vacuum bottoms component.

11. The method of claim 9 comprising:
   a) forming a mixture comprising 10 to 80 wt. % solvent deasphalting bottoms, 2 to 10 weight percent of bottoms from rerefining of a lube oil, 0 to 20 wt. % of fluxing component, and 0 to 50 wt. % of a vacuum bottoms component.

12. The method of claim 9 wherein said bottoms from rerefining of a lube oil contain at least 0.1 wt. % of viscosity index improver.

13. The method of claim 9 wherein said bottoms from rerefining of a lube oil contain 1 to 5 wt. % of viscosity index improver.

14. A pavement composition comprising an aggregate material and from 1.0% to 20.0% of a paving asphalt composition comprising a mixture containing solvent deasphalting bottoms and bottoms from rerefining of a lube oil by a process consisting essentially of distillation.

15. The pavement composition of claim 14 wherein said mixture contains at least 0.5 wt. % solvent deasphalting bottoms, 0.5 to 50 weight percent of bottoms from rerefining of a lube oil, 0 to 50 wt. % of fluxing component, and 0 to 90 wt. % of a vacuum bottoms component.

16. The pavement composition of claim 14 wherein said mixture contains 5 to 90 wt. % solvent deasphalting bottoms, 1 to 30 weight percent of bottoms from rerefining of a lube oil, 0 to 30 wt. % of fluxing component, and 0 to 60 wt. % of a vacuum bottoms component.

17. The pavement composition of claim 14 wherein said mixture contains 10 to 80 wt. % solvent deasphalting bottoms, 2 to 10 weight percent of bottoms from rerefining of a lube oil, 0 to 20 wt. % of fluxing component, and 0 to 50 wt. % of a vacuum bottoms component.

18. The pavement composition of claim 14 wherein said bottoms from rerefining of a lube oil contain at least 0.1 wt. % of viscosity index improver.

19. The method of claim 14 wherein said bottoms from rerefining of a lube oil contain 1 to 5 wt.% of viscosity index improver.

* * * * *